United States Patent
McWilliams

(10) Patent No.: US 10,788,269 B2
(45) Date of Patent: Sep. 29, 2020

(54) COOLING SYSTEM FOR MOBILE BULK TANKS

(71) Applicant: Wabash National, L.P., Lafayette, IN (US)

(72) Inventor: Steven McWilliams, DeForest, WI (US)

(73) Assignee: Wabash National, L.P., Lafayette, IN (US)

(*) Notice: Subject to any disclaimer, the term of this patent is extended or adjusted under 35 U.S.C. 154(b) by 102 days.

(21) Appl. No.: 15/786,827

(22) Filed: Oct. 18, 2017

(65) Prior Publication Data

US 2018/0128550 A1 May 10, 2018

Related U.S. Application Data

(60) Provisional application No. 62/418,351, filed on Nov. 7, 2016.

(51) Int. Cl.
| | |
|---|---|
| *F28D 1/06* | (2006.01) |
| *F28D 20/00* | (2006.01) |
| *F28D 15/06* | (2006.01) |
| *B60P 3/22* | (2006.01) |

(52) U.S. Cl.
CPC ............. *F28D 1/06* (2013.01); *B60P 3/2295* (2013.01); *F28D 15/06* (2013.01); *F28D 20/0034* (2013.01); *F28D 20/0039* (2013.01); *Y02E 60/142* (2013.01)

(58) Field of Classification Search
CPC .. B60P 3/2295; B60P 3/20; F28D 1/06; F28D 15/06; F25D 31/006; A01J 9/04; F17C 2221/014; B60H 1/00335; B60H 1/00014; B65D 88/744; B65D 88/128; B65D 88/748; B65D 88/74; B65D 90/022
See application file for complete search history.

(56) References Cited

U.S. PATENT DOCUMENTS

| | | | | |
|---|---|---|---|---|
| 2,922,287 | A * | 1/1960 | Rae ........................... | F17C 3/10 62/48.3 |
| 3,096,626 | A * | 7/1963 | Morrison .................. | B60P 3/20 62/60 |
| 3,269,458 | A * | 8/1966 | Rogers ..................... | H01J 19/36 165/281 |
| 3,385,073 | A * | 5/1968 | Snelling .................. | F25D 3/105 62/52.1 |
| 3,547,047 | A * | 12/1970 | Needham .................. | F17C 3/04 105/358 |
| 3,612,093 | A * | 10/1971 | Gramse ..................... | B60P 3/20 137/347 |
| 3,799,831 | A * | 3/1974 | Griffiths .................. | B23P 15/26 156/297 |

(Continued)

FOREIGN PATENT DOCUMENTS

| | | | | |
|---|---|---|---|---|
| DE | 202013011952 U1 | * | 11/2014 | .......... B65D 88/128 |
| EP | 0860379 A1 | * | 8/1998 | .......... B65D 88/748 |

(Continued)

*Primary Examiner* — Frantz F Jules
*Assistant Examiner* — Martha Tadesse
(74) *Attorney, Agent, or Firm* — Quarles & Brady LLP

(57) ABSTRACT

A cooling system for a mobile bulk tank that includes a heat exchanger disposed to remove heat from a top wall of the mobile bulk tank. A flow system that is configured to move coolant through the heat exchanger to cool the bulk tank.

20 Claims, 3 Drawing Sheets

(56) References Cited

U.S. PATENT DOCUMENTS

| | | | | |
|---|---|---|---|---|
| 4,038,833 | A | * | 8/1977 | Foessl ................... F25D 3/105<br>62/223 |
| 4,593,529 | A | * | 6/1986 | Birochik ................. F17C 13/02<br>62/3.3 |
| 4,756,447 | A | * | 7/1988 | Gerhard ............... B65D 88/748<br>220/565 |
| 5,954,101 | A | * | 9/1999 | Drube .................... F16K 31/30<br>141/18 |
| 7,293,417 | B2 | * | 11/2007 | Baudat ................... F17C 3/022<br>62/45.1 |
| 8,388,045 | B2 | * | 3/2013 | Huang ................. B62D 33/046<br>296/181.1 |
| 2002/0195019 | A1 | * | 12/2002 | Woodall .................. B61D 5/04<br>105/358 |
| 2004/0112079 | A1 | * | 6/2004 | Omuta ..................... A01J 9/04<br>62/435 |
| 2011/0253342 | A1 | * | 10/2011 | Lurken .................. F25D 3/105<br>165/104.11 |
| 2012/0292940 | A1 | * | 11/2012 | Huang ................. B62D 33/048<br>296/39.3 |
| 2013/0192684 | A1 | * | 8/2013 | Ohkami ................. B65D 90/50<br>137/14 |
| 2015/0336732 | A1 | * | 11/2015 | Denson ................ B65D 90/023<br>220/592.25 |
| 2017/0096092 | A1 | | 4/2017 | Cannon et al. |
| 2017/0253168 | A1 | | 9/2017 | Cannon |

FOREIGN PATENT DOCUMENTS

| | | | | |
|---|---|---|---|---|
| EP | 2107013 | A1 | * 10/2009 | ........... B65D 88/748 |
| FR | 2739362 | A1 | * 4/1997 | ........... B65D 88/128 |
| FR | 2942308 | A1 | * 8/2010 | ........... F25D 31/006 |
| GB | 1150365 | A | * 4/1969 | ........... B65D 88/128 |
| JP | 07008127 | A | * 1/1995 | |
| JP | 10170123 | A | * 6/1998 | |
| JP | 2001225892 | A | * 8/2001 | |
| JP | 2002173088 | A | * 6/2002 | |
| JP | 2007106450 | A | * 4/2007 | |
| KR | 20120110465 | A | * 10/2012 | |
| WO | WO-2004015340 | A1 | * 2/2004 | ........... F25D 11/003 |
| WO | WO-2009147193 | A1 | * 12/2009 | ........... B60H 1/3202 |
| WO | WO-2011048266 | A1 | * 4/2011 | ........... B65D 88/748 |
| WO | WO-2011142665 | A1 | * 11/2011 | ........... B65D 88/748 |
| WO | WO-2013141707 | A3 | * 12/2013 | ........... B65D 88/128 |

* cited by examiner

COOLING SYSTEM FOR MOBILE BULK TANKS

RELATED APPLICATION

The present application claims the benefit of U.S. Application Ser. No. 62/418,351, filed Nov. 7, 2016, and entitled "Cooling System for Mobile Bulk Tanks," the entire disclosure of which is incorporated herein by reference.

BACKGROUND

Mobile bulk tanks, such as those included on tanker trailers or configured for use with other vehicles (e.g., tanker or other train cars, wheeled or tracked platforms for transporting portable tanks, and so on), can be used to carry a variety of products, including both food-grade and non-food-grade products. For food-grade and other products, regulatory or other considerations may sometimes require that the products are maintained within a particular temperature range (e.g., below a particular maximum temperature). In some cases, failure to maintain products within a particular temperature range during transport (or at other times) can result in total loss of some shipments.

Conventional mobile bulk tanks, such as those configured for transport on tanker trailers, generally do not include active cooling equipment to help maintain products within the tanker trailers within an appropriate temperature range. Rather, for example, some conventional mobile bulk tanks are merely equipped with insulation in order to reduce the rate of heat transfer from the environment into the tanks' interiors. In some cases, however, economical and practicable passive insulation systems may be inadequate to maintain a desired temperature range. For example, use of passive insulation may not always provide adequate protection against over-warming of the relevant products in the face of relatively warm environmental conditions, relatively cool products, relatively long travel distances or times, or relatively long idle times before offloading (e.g., once a tanker trailer has arrived at a processing facility).

SUMMARY

The present invention relates generally to cooling systems for mobile bulk tanks. In particular, embodiments of the present invention relate to systems for cooling food-grade and other bulk tanks on tanker trailers.

As also discussed above, different situations (e.g., transportation applications) can require appropriate management of heat transfer for mobile bulk tanks, in order to ensure that the products carried by the tanks are maintained within a desired temperature range. In some cases, for example, this can be particularly important for liquid (or other) food-grade products, such as raw milk.

Generally, a cooling system according to the invention can help to maintain a desired temperature range for products during transport and at other times (e.g., as a tanker trailer waits at a processing facility). To this end, for example, the invention can include a coolant source and a flow system configured to circulate the coolant relative to a mobile bulk tank (e.g., of a tanker trailer or other vehicle). The flow system can include a heat exchanger disposed at least partly at a top portion of the bulk tank (or elsewhere), as well as ducts to carry the coolant to the heat exchanger, and a pump to drive the coolant flow. As the coolant is moved through the heat exchanger, heat can be removed from the top portion of the bulk tank (or elsewhere), thereby appropriately cooling the tank's contents.

In some embodiments, it can be useful to provide a flow system that keeps the coolant separate from a liquid (or other load) contained by a bulk tank. For example, the ducts and heat exchanger of the flow system can be configured to attach to the exterior of the bulk tank, without invasive attachment mechanisms (e.g., without welds, rivets, screws, and so on). Various arrangements of the flow system can be employed to this end, including, for example, plastic flow ducts that can be taped or otherwise non-invasively secured to the outer walls of a tank trailer. In some embodiments, corrugated plastic or other sheeting can be used to provide a non-invasive heat exchanger with a relatively high heat-transfer area.

In some embodiments, the flow system can be supported by the bulk tank it is configured to cool (e.g., directly, or indirectly via a vehicle that is configured to transport the bulk tank), so that cooling can be provided during active transport of the relevant load. In some embodiments, aspects the flow system can be separately supported, or otherwise configured to interface with a separately supported system, so that cooling can be provided at other times. For example, a flow system for a bulk tank can include a manifold or other interface to connect with flow ducts, coolant reservoirs, or other components of a stationary system. In this way, for example, when a relevant vehicle (e.g., a tanker trailer or train car supporting the bulk tank) is parked at a processing (or other off-loading) facility, a stationary system at the facility can be used to maintain the bulk tank within a desired temperature range for an extended amount of time.

In some embodiments, the invention provides a cooling system for a mobile bulk tank. A heat exchanger can be disposed to remove heat from a top wall of the bulk tank, and a flow system at least partly supported by the bulk tank can be configured to move coolant from a reservoir to the heat exchanger to cool the bulk tank.

In some embodiments, the invention provides a vehicle with a bulk tank, a plurality of flow passages, and a pump. The flow passages can be at least partly defined by a top exterior wall of the bulk tank, and the pump can be configured to move coolant through the flow passages to cool the bulk tank via the top exterior wall.

DETAILED DESCRIPTION

Figure 1:
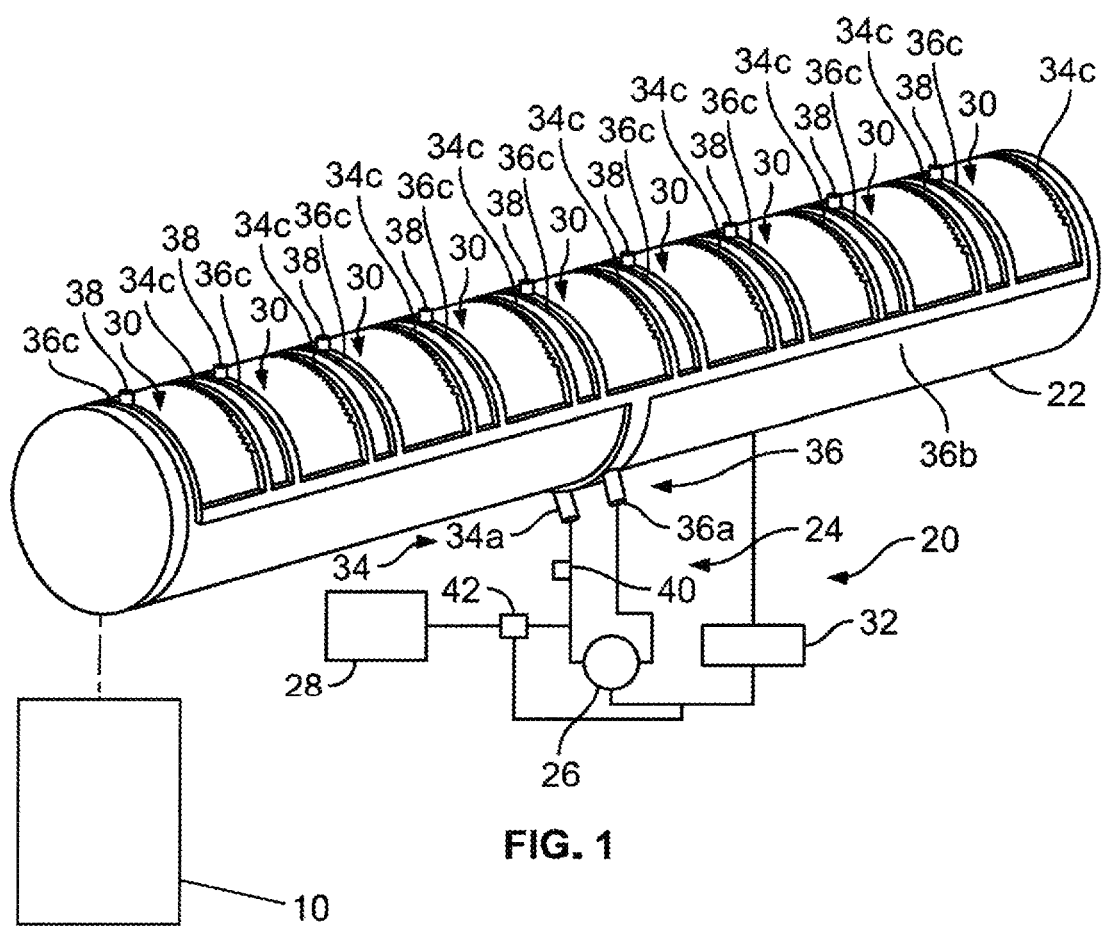
FIG. 1 is a top, left, rear isometric view of a mobile bulk tank with a cooling system according to one embodiment of the invention, with some aspects of the cooling system illustrated schematically.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 2:
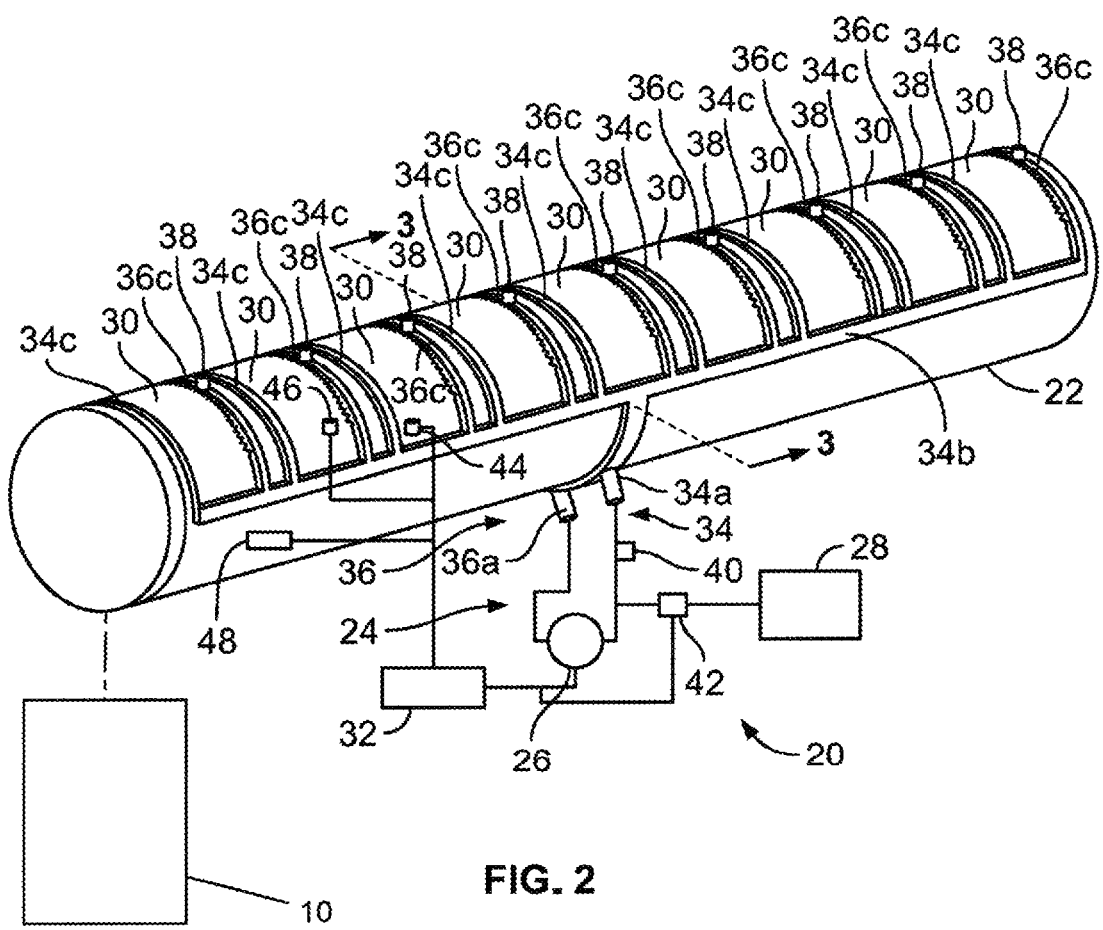
FIG. 2 is a top, right, front isometric view of the mobile bulk tank and the cooling system of FIG. 1, also with some aspects of the cooling system illustrated schematically.

An example cooling system 20 for a mobile bulk tank is illustrated in FIGS. 1 and 2. In the embodiment illustrated, the cooling system 20 is installed for use with a bulk tank 22 of a tanker trailer, which is configured as a generally cylindrical tank for transporting liquids (e.g., food-grade liquids). The bulk tank 22 can be supported by a chassis (not shown) and wheels (not shown) and can be generally configured to be towed by a tractor vehicle 10. In other embodiments, other configurations for the bulk tank 22, or for a mobile bulk tank generally, are possible. For example, in some embodiments, the bulk tank 22 (or another mobile bulk tank) can be configured to be supported, and transported by, a train car, a self-powered cart, a tanker truck, or another vehicle.

Generally, the cooling system 20 includes a flow system 24 with a pump 26 (e.g., a multi-phase pump or a blower), a reservoir 28 for coolant, and a controller 32 configured to control (e.g., electronically, hydraulically, electro-hydraulically, and so on) various components of the cooling system 20. In order to cool the bulk tank 22 and its contents, the pump 26 can be operated to move coolant through the flow system 24 to a set of heat exchangers 30 at the top side of the bulk tank 22. Heat within the bulk tank 22 (e.g., as may naturally rise to the top of the bulk tank 22 via convection or other processes) can then be transferred from the bulk tank 22 to the coolant via the heat exchangers 30. In some embodiments, a heat exchanger arrangement (e.g., the heat exchangers 30) can additionally (or alternatively) be disposed at other locations on a cargo tank, including the sides, the bottom, or the headers of the cargo tank.

Generally, a flow system according to the invention can be configured in various ways, in order to move coolant appropriately through relevant heat exchangers and thereby effect heat transfer out of the relevant compartment(s) of a mobile bulk tank. In the embodiment illustrated, the flow system 24 includes a duct system with a set of feed ducts 34, and a set of return ducts 36. The feed ducts 34, as illustrated in particular in FIG. 2, include a main feed duct 34a, a longitudinally extending feed manifold 34b, and a set of distribution ducts 34c extending circumferentially from the feed manifold 34b to connect to the heat exchangers 30. Similarly, the return ducts 36, as illustrated in particular in FIG. 1, include a main return duct 36a, a longitudinally extending return manifold 36b, and a set of collection ducts 36c extending circumferentially from the heat exchangers 30 to the return manifold 36b. Accordingly, when the pump 26 operates, coolant can be generally moved through the main feed duct 34a to the feed manifold 34b, then through the various distribution ducts 34c to the various heat exchangers 30. After passing through the heat exchangers 30, the coolant can generally move through the collection ducts 36c to the return manifold 36b, and can then pass from the return manifold 36b to the main return duct 36a for further pumping (as appropriate).

In some embodiments, various internal, external, or other components can additionally (or alternatively) be included in a flow system. For example, in some embodiments, the flow system 24 can be equipped with internal baffles, valves, or other flow regulators (not shown). This may be useful, for example, in order to appropriately distribute flow from the main feed duct 34a to the various distribution ducts 34c. Similarly, in some embodiments, other flow regulators (e.g., valves) or flow connections can be provided in order to controllably release coolant from, or admit coolant into, the flow system. As illustrated in FIGS. 1 and 2, for example, the flow system 24 includes a set of outlet valves 38, as well as an inlet device 40 (e.g., a quick-connect manifold configured to engage an external flow line). As also discussed below, the outlet valves 38 can be used to purge the flow system 24 or otherwise release fluid from the flow system 24, and the inlet device 40 can be used to admit coolant (or other fluids) into the flow system 24. In other embodiments, other arrangements are possible, including arrangements with differently configured inlet or outlet devices.

Generally, as also noted above, a flow system according to the invention can be placed in communication with a reservoir in order for the flow system to be supplied with coolant. In the embodiment illustrated in FIGS. 1 and 2, the flow system 24 is configured to be supplied with coolant by the reservoir 28, which is supported by the relevant vehicle (e.g., a tanker trailer) so that the reservoir 28 can travel with the bulk tank 22 and thereby assist in providing in-transit cooling. In some embodiments, the coolant reservoir 28 can instead be installed independently from the relevant tanker trailer or other transport vehicle (e.g., at a processing facility or on a separate, mobile platform) so that coolant can be provided to the bulk tank 22 at a fixed location. Correspondingly, external flow conduits (not shown) can also be provided, in order to transfer fluid between the reservoir and the inlet device 40.

In some embodiments, the reservoir 28 can be configured to travel with the relevant tanker trailer (or other vehicle) and a separate reservoir (not shown) can be installed independently of the tanker trailer (or other vehicle). In this way, for example, coolant from the reservoir 28 can be used to cool the bulk tank 22 during transport, and coolant from the separate reservoir can be used to cool the bulk tank 22 at other times (e.g., when the relevant vehicle is parked and waiting for offloading).

In some embodiments, a flow system for a cooling system can include a regulator in order to control flow of coolant from a relevant reservoir into the flow system. As illustrated in FIGS. 1 and 2, for example, the cooling system 20 includes a blending device 42 (e.g., an electronically controlled blending door) that can operate to selectively admit coolant from the reservoir 28 into the flow system 24 for circulation through the heat exchangers. The blending device 42 can generally be operated based upon commands from the controller 32, which can in turn be based upon temperature data gather from one or more of various sensors (e.g., a hot-side temperature sensor 44, a cool-side temperature sensor 46, or a bulk-tank temperature sensor 48). In the embodiments illustrated, the blending device 42 is illustrated as feeding into the flow system 24 downstream of the pump 26. In other embodiments, other arrangements are possible.

In some embodiments, a heat exchanger can be provided in order to vaporize LN2 (or other coolant) that is being drawn from the reservoir 28 so that the coolant can be used within the flow system 24 as a vapor (or two-phase mixture). For example, a heat exchanger can be integrated into the blending device 42, or disposed upstream or downstream of the blending device 42, so that coolant from the reservoir 28 is largely vaporized before flowing (or as it flows) into the flow system 24. In some embodiments, as also discussed below, coolant can be re-liquefied at various stages (e.g., as part of rejecting to the environment energy received via the heat exchangers 30).

In some embodiments, it can be useful to configure flow passages of one or more of the heat exchangers so that a top wall of the relevant compartment is directly exposed to coolant flow. As illustrated in particular in FIG. 3, for example, the heat exchangers 30 of the cooling system 20 are formed from curved, corrugated sheeting 60 secured to the top exterior wall 22a of the bulk tank 22. With the corrugated sheeting 60 installed as illustrated, the corrugations of the corrugated sheeting 60 cooperate with the top exterior wall 22a to collectively define a set of heat-exchange ducts 62 extending longitudinally along the bulk tank 22. Accordingly, when the pump 26 operates to move coolant through the flow system 24, the coolant can flow along the heat-exchange ducts 62 in direct contact with the top exterior wall 22a, and can thereby cool the bulk tank 22 with relatively high efficiency. As also noted above, in some embodiments, a heat exchanger can be provided at locations other than the top of a mobile bulk tank. Accordingly, in some embodiments, coolant flowing through a heat exchanger can be in direct contact with exterior walls of a bulk mobile tank at locations other than the top of the bulk mobile tank.

In some embodiments, the corrugated sheeting 60 can be formed from composite material (e.g., flexible plastic), by extrusion, molding, or other processes. This may be useful, for example, in order to provide a relatively light-weight and appropriately flexible and strong configuration. In other embodiments, the corrugated sheeting 60 can be formed from other materials or in other ways.

Generally, it may be undesirable for coolant for the cooling system 20 to infiltrate the bulk tank 22 or otherwise intermingle with the contents of the bulk tank 22. However, where heat exchangers are secured to a bulk tank using invasive attachments such as rivets, welds, screws, and so on, cracks or other openings in the walls of the bulk tank can result. This can correspondingly provide a flow path for the coolant to infiltrate the bulk tank.

Figure 3:
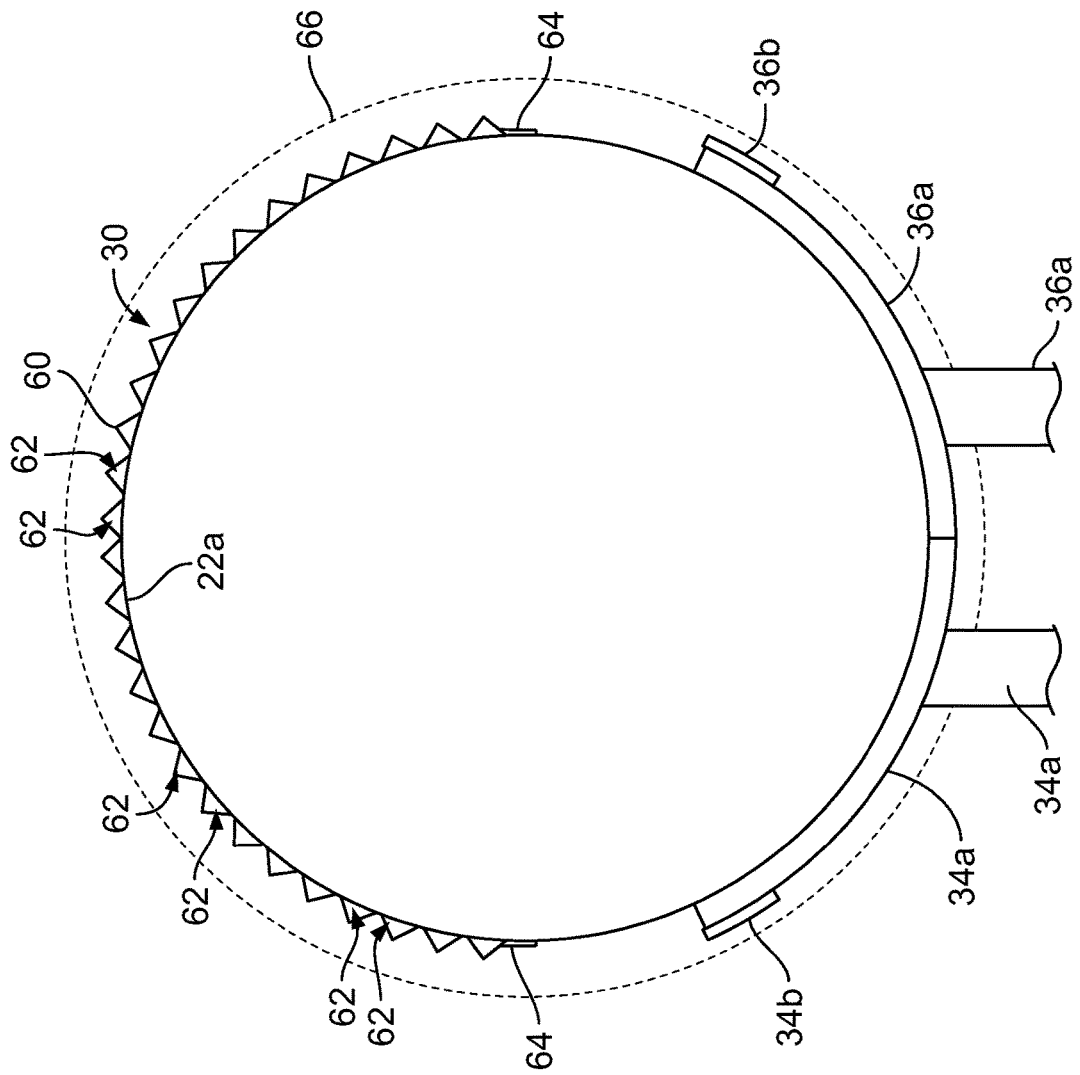
FIG. 3 is a rear cross-sectional view of some aspects of the mobile bulk tank and the cooling system of FIG. 1, taken along line 3-3 of FIG. 2.

Accordingly, it may be useful to attach the heat exchangers 30 to the bulk tank 22 using non-invasive attachments. For example, adhesive can be used to secure the lateral edges of the corrugated sheeting 60 (or other heat-exchanger elements) to the bulk tank 22. In this way, for example, the heat exchangers 30 can be secured to the bulk tank 22 to provide heat-exchange ducts 62 for cooling of the bulk tank 22, without potentially creating flow paths for infiltration of coolant into the bulk tank 22. In some embodiments, as illustrated in FIG. 3 in particular, adhesive can be used in the form of adhesive tape 64 that can be installed to extend longitudinally along opposite edges of the heat exchangers 30, or at various other locations.

In some embodiments, differently configured heat exchangers can be used. For example, corrugated sheeting similar to the corrugated sheeting 60 can be employed, but can be oriented to provide heat-exchange ducts that extend obliquely or perpendicularly relative to the longitudinal direction of the bulk tank 22. As another example, heat-exchange ducts can be formed using material other than corrugated sheeting, or can be formed directly into the bulk tank 22 (not shown) or into an insulating layer thereof (not shown).

In some embodiments, one or more of the heat exchangers 30 can be thermally insulated relative the surrounding environment. For example, as illustrated in FIG. 3, some embodiments of the bulk tank 22 can be equipped with an external layer of insulation 66, which can be configured to extend around the heat exchangers 30 as well as the bulk tank 22. In some embodiments, a dedicated layer of insulation (not shown) can be provided for one or more of the heat exchangers 30 alone.

As well as conventional heat transfer considerations, choice of a particular coolant can also be informed by considerations regarding the integrity of the contents of a mobile bulk tank. As noted above, for example, it may sometimes be possible for coolant to infiltrate a bulk tank via cracks or other flaws. If the coolant is selected to be generally non-contaminating, the potentially negative effects of such infiltration can be thereby reduced or eliminated. Accordingly, in some embodiments, the reservoir 28 (or another reservoir) can be configured to contain liquid nitrogen ("LN2") as a coolant. Due to the relatively inert and non-toxic nature of nitrogen, even if this coolant (e.g., as nitrogen vapor) were to infiltrate the bulk tank 22, the contents of the bulk tank 22 would not necessarily be compromised so as to result in a loss of the shipment. Further, the relatively cold temperatures of the LN2, and any vapor immediately resulting therefrom, can provide for relatively robust cooling capabilities for the cooling system 20 generally.

Referring again to FIGS. 1 and 2, an example method of operation of the cooling system 20 will be described. Initially, before actual cooling of the bulk tank 22 begins, it may be useful to purge the flow system 24 of moisture or other contaminants. Accordingly, for example, the pump 26 can be operated with one or more of the outlet valves 38 (or other outlet of the flow system 24) in an open configuration, in order to drive undesired contents out of the flow system 24 (e.g., to the environment, as appropriate). If desired, an amount of LN2 (or vaporized nitrogen) can be admitted into the flow system 24 in order to assist in driving moisture or other contaminants out of the flow system 24 during the purge operation. In some embodiments, a purge operation can be largely automated, with the controller 32 controlling operation of the outlet valves 38 (or other outlets) as well as operation of the pump 26 and other relevant equipment.

Once the flow system 24 is ready for cooling operations (e.g., after the purge described above), any open outlets (e.g., the outlet valves 38) can be closed. The pump 26 can be operated to move coolant through the feed ducts 34 to the heat exchangers 30 and then through the return ducts 36 for recirculation. In this way, for example, relatively substantial heat transfer out of the bulk tank 22 can be effected, so that the contents of the bulk tank 22 can be kept appropriately cool for a relatively long interval of time.

During cooling operations, it may be useful for the controller 32 to actively monitor and control various functions of the relevant systems. Accordingly, in some implementations, as also noted above, the controller 32 can receive temperature data from one or more of the temperature sensors 44, 46, and 48 and then control the operation of the pump 26, the blending device 42, or other components (e.g., internal valves within the feed manifold 34b) based upon that data. For example, upon receiving temperature data indicating that the bulk tank 22 is not being appropriately cooled, the controller 32 can command the pump 26 to increase the flow rate of the coolant or can command the blending device 42 to admit more LN2 (or vaporized nitrogen) into the flow system 24 for circulation.

In some configurations, other sensors can also (or alternatively) be provided, as may be appropriate to generally support the control of the cooling system 20 by the controller 32. For example, the controller 32 can be configured to receive and interpret data from various sensors (not shown) that are configured to measure environmental temperature, flow-system or environmental humidity, mass flow rates, flow-system pressures, gas-liquid ratios, saturation levels, pressure of the reservoir 28, oxygen or other chemical levels (e.g., within the bulk tank 22), and so on. Based upon these data, the controller 32 can then control the pump 26, the blending device 42, one or more valves (e.g., the outlet valves 38), or various other devices.

In some embodiments, as also discussed above, coolant can be provided to a flow system from an external reservoir, such as a fixed-location reservoir at a processing facility. In some implementations, the controller 32 can also be configured to control flow of coolant from such an external reservoir. For example, when the cooling system 20 is arranged to receive coolant via the inlet device 40, the controller 32 can be configured to control the inlet device 40 (e.g., via control of a blending device integrated therewith), or other components of the larger system, in order to regulate the flow of coolant from the external reservoir into the flow system 24.

In some embodiments, other components or configurations can additionally (or alternatively) be used. For example, in some embodiments, cooling of the bulk tank 22 can be accomplished using a refrigeration cycle, in which a compressor and expander (not shown) are integrated into the flow system 24, and an additional heat exchanger (not shown) is provided for rejection of heat from the coolant to the environment. In some embodiments, coolant from a reservoir can be used to cool, but can be kept generally separate from, coolant used in the heat exchangers for directly cooling the relevant cargo tank. For example, LN2 from a reservoir can flow through a heat exchanger to cool a separate coolant (e.g., dehydrated air) then vented to the environment, and the separate coolant can be pumped through different heat exchanger to cool the cargo tank.

In some embodiments, different arrangements of flow ducts can be provided. For example, in some embodiments, the feed manifold 34b can be configured to receive coolant from multiple feed ducts (not shown), or the various distribution ducts 34c can be configured to receive coolant individually rather than via the shared inlet provided by the feed manifold 34b. Similarly, in some embodiments, multiple pumps, reservoirs, or other components can be provided, or the heat exchangers (or various other components) can be arranged in different configurations on the bulk tank 22.

Thus, embodiments of the disclosed cooling system can provide various benefits compared to conventional arrangements for mobile bulk tanks. For example, in some embodiments, the disclosed cooling system may provide relatively efficient and mobile cooling of the contents of a bulk tank, so that an appropriate temperature range for the contents may be maintained for relatively long times. Accordingly, for example, mobile bulk tanks equipped with embodiments of the disclosed cooling system may be able to travel farther, for longer, and in hotter conditions than conventionally equipped mobile bulk tanks, without compromising the temperature requirements of the relevant loads.

The foregoing description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein

The invention claimed is:

1. A cooling system for a mobile bulk tank, the mobile bulk tank being configured to be transported by a vehicle, the cooling system comprising:
 a heat exchanger disposed to remove heat from a top wall of the mobile bulk tank, the heat exchanger including corrugated sheeting secured to the top wall of the mobile bulk tank to define, in combination with the top wall of the mobile bulk tank, a plurality of flow ducts for a coolant so that the coolant is in direct contact with the top wall, wherein the corrugated sheeting is secured to the top wall of the mobile bulk tank using an adhesive;
 a reservoir containing the coolant; and
 a flow system at least partly supported by the mobile bulk tank and configured to move the coolant to the heat exchanger to cool the mobile bulk tank.

2. The cooling system of claim 1, wherein the reservoir is supported by and configured to travel with the vehicle.

3. The cooling system of claim 1, wherein the coolant includes liquid nitrogen.

4. The cooling system of claim 1, further comprising:
 a controller;
 wherein the controller is configured to:
  monitor temperature data for at least one of the mobile bulk tank or the coolant; and
  control the flow system based upon the temperature data.

5. The cooling system of claim 4, further comprising:
 a blending device in fluid communication with the reservoir and the flow system;
 wherein controlling the flow system based upon the temperature data includes controlling the blending device to admit controlled amounts of the coolant into the flow system.

6. The cooling system of claim 1, wherein the flow system includes a flow connection configured to receive an external coolant connection.

7. The cooling system of claim 6, wherein the reservoir is installed in a fixed location that is remote from the vehicle; and
 wherein the external coolant connection is configured to deliver the coolant from the reservoir to the flow system via the flow connection.

8. The cooling system of claim 1, wherein external insulation of the mobile bulk tank extends over the heat exchanger.

9. The cooling system of claim 1, wherein a plurality of flow ducts of the heat exchanger extend longitudinally along the mobile bulk tank.

10. A vehicle comprising:
a bulk tank with a top exterior wall;
a plurality of flow passages defined by corrugated sheeting secured to the top exterior wall of the bulk tank and at least partly defined by the top exterior wall so that a coolant flowing through the plurality of flow passages directly contacts the top exterior wall;
a pump configured to move the coolant through the plurality of flow passages to cool the bulk tank via the top exterior wall, wherein the corrugated sheeting is non-invasively secured to the top exterior wall of the bulk tank.

11. The vehicle of claim 10, further comprising:
a reservoir for the coolant, the reservoir being supported by and configured to travel with the vehicle.

12. The vehicle of claim 11, wherein the coolant includes vaporized liquid nitrogen.

13. The vehicle of claim 10, wherein the corrugated sheeting is at least partly covered by an external insulation layer.

14. The vehicle of claim 10, wherein the plurality of flow passages defined by channels of the corrugated sheeting extend longitudinally along the bulk tank.

15. The vehicle of claim 14, wherein the plurality of flow passages are defined by multiple distinct corrugated sheeting arranged longitudinally along the bulk tank, wherein each distinct corrugated sheeting forms a heat exchanger to provide a plurality of heat exchangers along the bulk tank.

16. The vehicle of claim 10, further comprising a flow connection in fluid communication with the pump; wherein the flow connection is configured to receive an external coolant connection to provide the coolant to cool the bulk tank.

17. The vehicle of claim 15, further comprising a main feed duct in communication with the pump, a feed manifold in communication with the main feed duct, and a plurality of distribution ducts extending from the feed manifold, wherein each of the plurality of heat exchangers is in direct communication with one of the plurality of distribution ducts so that the coolant is moved from the pump to the main feed duct, to the feed manifold, to the plurality of distribution ducts, to each of the plurality of heat exchangers to move the coolant through the plurality of flow passages.

18. The cooling system of claim 1, wherein the heat exchanger includes a plurality of heat exchangers, and each heat exchanger of the plurality of heat exchangers includes the plurality of flow ducts.

19. The cooling system of claim 1, wherein the each of the plurality of flow ducts is triangular in cross section.

20. A cooling system for a mobile bulk tank, the mobile bulk tank being configured to be transported by a vehicle, the cooling system comprising:
a heat exchanger disposed to remove heat from a top wall of the mobile bulk tank;
a reservoir containing a coolant;
a flow system at least partly supported by the mobile bulk tank and configured to move the coolant to the heat exchanger to cool the mobile bulk tank; and
a controller, wherein the controller is configured to:
monitor temperature data for at least one of the mobile bulk tank or the coolant;
monitor at least one of humidity, mass flow, gas-liquid ratio, saturation level, or oxygen levels within the flow system; and
control the flow system based upon the temperature data and the at least one of humidity, mass flow, gas-liquid ratio, saturation level, or oxygen levels.

\* \* \* \* \*